United States Patent [19]

Wszolek et al.

[11] 4,434,215
[45] Feb. 28, 1984

[54] BATTERY SEPARATOR

[75] Inventors: Walter R. Wszolek, Sykesville; Joseph T. Lundquist, Jr., Columbia, both of Md.

[73] Assignee: W. R. Grace & Co., New York, N.Y.

[21] Appl. No.: 414,004

[22] Filed: Sep. 2, 1982

[51] Int. Cl.³ ............................................. H01M 2/16
[52] U.S. Cl. .................................... 429/144; 429/249; 429/251
[58] Field of Search ............... 429/144, 249, 254, 206, 429/204, 205, 251; 525/285, 260, 263, 265; 428/421; 204/159.17; 427/4, 115

[56] References Cited

U.S. PATENT DOCUMENTS

| | | | |
|---|---|---|---|
| 3,427,206 | 2/1969 | Scardaville et al. | 429/144 |
| 3,615,865 | 10/1971 | Wetherell | 429/254 |
| 3,892,594 | 7/1975 | Charlesby et al. | 429/137 |
| 3,928,497 | 12/1975 | Ohmori et al. | 525/285 |
| 4,230,549 | 10/1980 | D'Agostino et al. | 428/421 X |
| 4,287,276 | 9/1981 | Lundquist, Jr. | 429/206 |

Primary Examiner—Anthony Skapars
Attorney, Agent, or Firm—Howard J. Troffkin

[57] ABSTRACT

A composition suitable for use as a battery separator comprising a substantially homogeneous mixture of a copolymer of ethylene and acrylic acid having from 10 to 23 mole percent acrylic acid therein and a melt index of from about 0.1 to 5 in combination with a copolymer of ethylene and acrylic acid having at least 25 mole percent acrylic acid therein and having a melt index of at least about 10. The present invention is further directed to a process of forming a sheet product from the subject composition and the use of the formed product as a battery separator.

8 Claims, No Drawings

BATTERY SEPARATOR

BACKGROUND OF THE INVENTION

The instant invention is directed to a composition capable of forming a superior battery separator membrane and to a process of forming the membrane from the subject composition.

Alkaline battery systems, because of their high energy density, have great potential for replacing the more conventional lead-acid battery system in a number of terrestrial applications and/or where a light, portable energy source is required. Typical electrode combinations of such battery systems include silver-zinc, nickel-cadmium, and nickel-zinc. The potential of alkaline batteries utilizing nickel-zinc electrode combinations has not been fully realized due to the limitation of the repeated cycling without an irreversible loss of capacity upon repeated recharge. This limitation is due to the zinc electrode and the failure of the battery separator to inhibit zinc dendrite formation between the zinc and nickel electrodes which leads to battery failure.

One of the recognized key components in extending the life and efficiency of the battery is its separator. The separator is a membrane located between the plates which freely permits electrolytic conduction. Contact between plates may be due to imperfections in the plate structure or due to warping or wrinkling of the plate during use. Such macro deformations are readily inhibited by any type of sheet meterial which is coextensive with that of the plates. Contact may also occur due to the formation of dendrites or localized needle like growths on an electrode, such as zinc dendrites formed on a zinc electrode in an alkaline nickel-zinc battery system. These dendrites bridge the gap between electrodes of opposite polarity either by puncturing the separator membrane located in the gap, or by passing through the pores of the separator. The high degree of solubility of zinc oxide in alkaline electrolytes normally permits extensive loss of active material from the negative electrode through deposition of the zinc oxide in the separator pores and onto the positive electrode. These factors cause shorting out of the battery system and significantly reduce its effective life. The ability to produce a separator membrane which can effectively act as a dendristatic diaphragm is a required criteria for forming an effective battery system.

A battery separator which is capable of increasing the efficiency of a battery system and cause it to have a high energy density is highly desired, especially with respect to alkaline battery systems. It is generally agreed that such separators should be (a) resistant to degradation by the alkaline electrolyte and by oxidation due to nascent oxygen, (b) be very thin, (c) exhibit a high degree of inhibition to dendrite formation and growth, and (d) exhibit a high degree of electrolytic conductivity.

A considerable amount of effort has been directed to providing satisfactory separator materials for secondary alkaline battery systems, which illustrates the difficulty which has been encountered in providing the many diverse characteristics required for efficient functioning as a separator. Microporous separators, that is those that have discrete pores of from about 100 to 5000 Angstroms, usually in the form of a tortuous network, exhibit a high degree of electrolyte permeability and, therefore, a high degree of electrical conductivity. However, due to their porosity, such separators lack the ability to inhibit dendritic shorting. The zinc either deposits in the pores of the separator to eventually cause shorting between the positive and negative electrode pair or replates onto the zinc electrode in the form of trees or needles (dendrites) which form a bridge between electrodes of opposite polarity.

Separators which have been developed range from various organic microporous films or semi-permeable membranes to relatively rigid layers of inorganic, often ceramic, particles bonded together in some fashion. A further type of separator which has developed involves inorganic particles contained in an organic matrix. Despite the considerable effort in this field, the development of a viable separator material for secondary alkaline battery systems remains a primary obstacle to widespread utilization of such systems.

Microporous separators, such as those described in U.S. Pat. No. 4,287,276, are formed from an organic polymer matrix and contain inorganic particles utilize a wicking phenomenon due to the presence of inorganic material to carry the electrolyte through the separator. Some of the inorganic material or a secondary organic material in the matrix may be removed to provide a porous matrix to reduce the resistivity of such separators.

Separators have also been proposed which are in the form of a membrane, that is of a sheet product having virtually no or very low porosity. The pore size of such membrane separators is normally less than about 50 Angstroms and, therefore, readily inhibit dendrite penetration. However, materials, such as polyethylene, used to form such separators exhibit high resistivity (low conductivity), poor wetting and poor stability.

Modification of polyethylene membranes has been attempted to overcome the above discussed defects. Copolymers formed from polyethylene grafted by irradiation with a polar graft-polymerizable monomers, such as acrylic acid or methacrylic acid, have been suggested in U.S. Pat. Nos. 3,427,206; 3,615,865; 3,892,594; 3,928,497; 4,122,133; 4,230,549 and elsewhere as suitable materials to produce membrane separators. As the acrylic acid is grafted only in the amorphous regions of the polyethylene and not in the crystalline regions, the resulting separators exhibit irregular properties and instability as shown by high weight loss in accelerated oxidation tests.

British patent application GB No. 2,005,290A describes battery separators formed from material prepared by copolymerizing ethylene with small amounts of acrylic acid. Such materials have the defects of not being readily processable into sheet products, especially by commercially desired continuous methods, and of exhibiting high resistivity.

It is highly desired to form a membrane separator capable of use in an alkaline battery system. It is further desired to form a separator which is stable to oxidation and other conditions normally encountered in alkaline battery systems. It is still further desired to provide a separator which is capable of inhibiting dendristatic growth yet which has high conductivity. It is still further desired to produce a composition capable of readily forming into thin sheet form.

SUMMARY OF THE INVENTION

The present invention is directed to a composition, method of forming same and to separators suitable for alkaline battery systems; the composition comprising a combination of (a) a copolymer having a melt index of from 0 to 5 formed from ethylene and acrylic or methacrylic acid and having from about 10 to 23 mole percent of said acid therein; and (b) a copolymer having a melt index of about 10 or greater formed from ethylene and acrylic or methacrylic acid having from about 25 to 35 mole percent acrylic acid therein.

The weight ratio of (a) to (b) is from 0.3:1 to 2:1.

DETAILED DESCRIPTION OF THE INVENTION

It has been surprisingly found that a separator membrane having the desired properties of high inhibition to dendrite formation, high hydrolytic, oxidative and thermal stability under the conditions encountered in an alkaline battery, high conductivity and ease of processing into thin sheet material of good integrity can be formed by using the specific combination of copolymeric materials described in detail hereinbelow.

The composition found capable of achieving the combination of desired properties is formed from two distinct copolymers of ethylene and acrylic or methacrylic acid. The monomeric units of ethylene and acid of each of the copolymers is part of the polymer backbone. Stated another way, the subject copolymers are each a product of simultaneous polymerization of ethylene and acrylic or methacrylic acid or its precursor and not a graft copolymer formed from such monomers.

The first component of the subject composition is a copolymer of ethylene and acrylic or methacrylic acid (the terms "acid" or "acrylic acid" or "methacrylic acid" as used herein and in the appended claims shall interchangeably refer to both the acrylic acid and the methacrylic acid unless specifically indicated otherwise) in which the acrylic acid content is from 10 to 23, preferably from 15 to 23 mole percent of the copolymer. The copolymer is required to have a standard melt index of from 0 to 5 and preferably from 0.1 to 1. This copolymer can be viewed as the low melt index (high molecular weight), low acrylic acid content component of the present composition.

The second component of the subject composition is a copolymer of ethylene and acrylic acid. This second component is distinctly different from the first component as described above as it is required to have an acrylic acid content of at least 25 mole percent, preferably from 25 to 35 mole percent. This second copolymer is required to have a standard melt index of from at least about 10 to about 100, and preferably from about 10 to about 20. This copolymer can be viewed as the high melt index (moderate molecular weight), high acrylic acid content material.

The copolymers of the present invention can be formed by various known methods. For example, suitable copolymers can be formed directly from ethylene and acrylic acid by copolymerizing the monomers using conventional free radical initiators, such as benzoyl peroxide; or can be formed from ethylene and a lower $C_1$-$C_3$ alkyl ester of the acrylic acid, preferably the methyl ester, and subsequently hydrolyzed with aqueous alkali metal hydroxide, preferably KOH. Conventional chain transfer agents can be used to obtain the proper degree of polymerization.

The subject composition and separators formed therefrom are a substantially homogeneous mixture of (a) an ethylene/acrylic acid copolymer having from 10 to 23 mole percent acrylic acid therein and having a low melt index of from 0 to about 5, that is, a low melt index, low acrylic acid content copolymer; with (b) an ethylene/acrylic acid copolymer having from 25 to 35 mole percent acrylic acid therein and having a high melt index of from 10 to 100, that is a high melt index, high acrylic acid content copolymer in which the ratio of (a) to (b) is within the ratio of from 0.3:1 to 2:1 produces a material providing a combination of low electrical resistance, high inhibition to dendrite penetration and good stability under alkaline oxidizing conditions. Compositions formed from material or in amounts outside of the above required ranges do not achieve the desired results.

The copolymer materials, prior to formation into a sheet material, must be substantially neutralized with a strong base such as an alkali or alkaline earth metal hydroxide, preferably potassium or sodium hydroxide and most preferably potassium hydroxide. Thus, the process steps of forming the separator sheet product requires first forming the copolymers of ethylene and acrylic acid or their ester precursors, forming the alkali or alkaline earth metal salt of the acid of the copolymer, preferably with KOH, forming a substantially uniform mixture of the copolymers and processing, such as by pressing, the mixture into a sheet product. When one uses a single copolymer of ethylene/acrylic acid, as suggested in G.B. No. 2005290A, and neutralizes it prior to formation into a sheet product, such material is difficult to process and/or the sheet tends to degrade. The present composition permits formation of the desired salt product and processability into a sheet product.

It has been presently found that by using the required combination of copolymers, as described above, one unexpectedly attains a composition which can be readily formed into a sheet product using conventional processing techniques. The present composition as its substantially neutralized salt has been unexpectedly found to be readily processable, capable of retaining its integrity during processing, substantially free of voids, pinholes and the like, and, as prepared, provides a sheet product having a high degree of conductivity, being substantially inert to degradation by alkaline electrolyte and having a high degree of inhibition to dendrite penetration.

The sheet product should not be greater than 10 mils thick, normally from 0.5 to 10 mils with the preferred thickness being 0.5–5 mils. The sheet product can be used as a single sheet or can be laminated to itself to form a two or three ply laminated sheet product. The subject sheet product can be laminated to other products useful as battery separators, such as the membrane sheet products disclosed in U.S. Pat. No. 4,287,276, which teaching is incorporated herein by reference. The composite of a '276 membrane having the presently described sheet product laminated to at least one of its major surfaces provides a separator product of good conductivity with exceptionally high dendristatic inhibition.

The subject sheet product has been also found to be capable of forming a coating directly on battery electrode plates, such as by dipping the electrode plates into a solution containing the mixture of copolymers and air drying.

The following examples are made for illustrative purposes only and are not meant to be a limitation on the invention, as defined by the claims appended hereto.

All parts and percentages are by weight unless otherwise indicated.

The determinations of electrolytic resistivity (ohm-cm) or conductivity of the samples below were conducted by the procedure described in "Characteristics of Separators for Alkaline Silver Oxide Zinc Secondary Batteries: Screening Methods", edited by J. E. Cooper and A. Fleischer, Chapter 6, Electrical Resistance Direct Current Method by J. Lander and R. Weaver, Pg, 53, said teaching incorporated here by reference.

The determinations of inhibition to zinc dendrite penetration of the samples below were conducted by the procedure described in "Characteristics of Separators for Alkaline Silver Oxide Zinc Secondary Batteries: Screening Methods" by J. E. Cooper and A. Fleischer, Chapter 12, Zinc Penetration by G. A. Dalin and F. Solomon, Page 129.

The stability of the samples as shown by weight gain (+) or loss (−) was determined by first subjecting each of the samples to a 45 weight percent KOH solution at room temperature for 24 hours, blotting, weighing duplicate samples prior to testing, subjecting each of the samples for 96 hours to a 45 weight percent aqueous KOH solution with nascent oxygen maintained at 80° C., blotting and reweighing the sample to determine any weight change. Changes of ±20 percent or greater are undesirable.

EXAMPLE I

A copolymer of ethylene/acrylic acid was formed by copolymerizing ethylene and acrylic acid monomers together using standard free radical polymerization technique. The monomers were present in amounts to form a polymer having 32 weight percent acrylic acid units therein. The Standard Load melt index (ASTM D-1238) of the polymer was 16.1. This polymer is identified as Copolymer A.

A second copolymer of ethylene/acrylic acid was formed by copolymerizing ethylene and an alkyl ester of acrylic acid together by standard techniques to form a high molecular weight copolymer. The material was hydrolyzed and acidified to form a copolymer having a Standard Load melt index of 0.5 (ASTM D-1238) and having 16 percent free acrylic acid units therein. This polymer is identified as Copolymer B.

51.2 parts of copolymer A, 73.8 parts of copolymer B (A to B ratio of 1.45) and 900 parts of water were placed in a high speed (CHEMCO) mixer. To this mixture was added 87.5 parts of a 34.1 percent potassium hydroxide solution. The mixer was sealed, heated to 110° C. and run for 30 minutes (36 psi) and then cooled to ambient temperature. The mixture was removed from the mixer and dried under vacuum to form a dry, uniform composition of the potassium metal neutralized salt of copolymers A and B.

A portion of the dried composition was placed between 2 Mylar sheets and pressed at 149° C. into a sheet of about 5 mils thickness. The sheet did not exhibit the presence of pin holes.

Samples of the sheet were tested according to the methods described above for Electrolytic Resistivity (ER) (67.9 ohm-cm after 1 day, 67 ohm-cm after 1 week, 68.7 ohm-cm after 30 days); Dendrite Penetraton Time (DP) (greater than 200 min.) and Stability (4.1 percent weight loss). The formed sheet product exhibited good combination of properties as a battery separator.

EXAMPLE II

A composition and sheet product was formed in the same manner as described in Example I above except that 60 parts of the 34.1% potassium hydroxide solution was used. The resultant product exhibited an ER of 65 ohm-cm; DP of greater than 200 and stability of 1.4 weight percent weight loss. The formed sheet product exhibited a good combination of properties as a battery separator.

EXAMPLE III

A composition and sheet product was formed in the same manner as described in Example I above except that 71.7 parts of copolymer A, 53.3 parts copolymer B (A to B ratio of 0.74) and 64.7 parts 34.1% KOH solution were used. The resultant product readily pressed into a thin pin hole free sheet of about 5 mil thick. The sheet product exhibited an ER of 44.7 ohm-cm, a DP of greater than 200 and stability of 14.8 percent (wt.) gain. The product exhibited a good combination of properties as a battery separator.

EXAMPLE IV

A composition and sheet product was formed in the same manner as described in Example I above except that 92.2 parts copolymer A, 32.8 parts of copolymer B (A to B ratio of 0.35) and 69.5 parts of 34.1% potassium hydroxide solution were used. The resultant product readily pressed into a thin pin hole free sheet of about 5 mils thick. The sheet exhibited an ER of 30.2 ohm-cm, a DP of greater than 200 and stability of 14.8 percent (wt.) gain. The product exhibited a good combination of properties as a battery separator.

EXAMPLE V

For comparative purposes, a composition and sheet product was formed from copolymers A and B in a ratio of 0.11. The formed sheet product had poor stability as shown by swelling to an undesirable extent and exhibiting a 44.2 percent gain in weight when exposed, all above, to hot alkaline solution.

EXAMPLE VI

For comparative purposes only, several samples were formed by the process described in Example I above except that copolymer B was substituted by a ethylene/acrylic acid copolymer formed in the manner described for copolymer A except having an acrylic acid content of 20 percent and a Melt Index of 15 (Copolymer C). Therefore, these samples represent a mixture of (a) high acrylic acid, high melt index and (b) low acrylic acid, high melt index.

Table I below summarizes the results exhibited by these materials.

TABLE I

| A/C | ER | DP | Stability |
|-----|----|----|-----------|
| 1.3 | 64 | >200 | +9.6 |
| 0.66 | 52 | >200 | +36.9 |
| 0.31 | 39 | >200 | +32.2 |

The results recorded in Table I show, when compared to sample of Examples I to IV, that compositions having comparable ratios of copolymers, do not exhibit the desired combination of properties when both are formed with high melt index materials. ER values are unexpectedly higher (undesired) and the stability is poorer in each instance.

What is claimed is:

1. A composition suitable for forming a battery separator sheet product comprising a mixture of (a) a copolymer of ethylene and acrylic acid or methacrylic acid, said acid substantially neutralized with an alkali or alkaline earth metal cation and said copolymer having from 10 to 23 mole percent of said acid therein and having a standard load melt index of from 0 to 5; and (b) a copolymer of ethylene and acrylic acid or methacrylic acid, said acid substantially neutralized with an alkali or alkaline earth metal cation and said copolymer having at least about 25 mole percent of acrylic acid therein and having a standard load melt index of from about 10 to 100; the weight ratio of (a) to (b) being from 0.3 to 2.

2. The composition of claim 1 wherein the copolymers are each substantially neutralized with potassium cation.

3. The composition of claim 1 wherein copolymer (a) contains from 15 to 23 mole percent of acrylic acid based on said copolymer and has a standard load melt index of from 0.1 to 1 and copolymer (b) contains from 25 to 35 mole percent of acrylic acid based on said copolymer and has a standard load melt index of from 10 to 20.

4. A sheet product of from 0.5 to 10 mils thickness formed from the composition of claims 1, 2 or 3.

5. In a battery having an electrolyte, at least one pair of a positive and a negative electrodes and a separator membrane between each adjacent positive and negative electrodes, the improvement comprising having said separator membrane formed from at least one sheet of the product of claim 4.

6. In a battery having an electrolyte, at least one pair of a positive and a negative electrodes and a separator membrane positioned between adjacent positive and negative electrodes, wherein the improvement comprises having each said separator membranes of less than 10 mils thick and being a laminate product of (1) a sheet formed from an admixture of from 7 to 30 weight percent polyolefin having an average molecular weight of at least 100,000; from 0 to 15 weight percent plasticizer; and from 50 to 93 weight percent of a filler selected from titania, alumina, magnesium hydroxide or calcium hydroxide, said filler having a surface area of from 100 to 385 $m^2/cc$ and a pore volume of at least 0.075 cc/gm and (2) at least one sheet material of claim 1, 2, or 3.

7. The battery of claim 6 wherein filler of sheet (1) of the laminate is titania having a surface area of from 125 to 385 $m^2/cc$ and a pore volume of from 0.08 to 0.8 cc/gm.

8. The battery of claim 6 wherein the sheet (1) of the laminate further contains up to 10 weight percent of a conductive carbon black having a surface area of at least 100 $m^2/cc$.

* * * * *